(12) United States Patent
Sureka

(10) Patent No.: US 8,468,155 B2
(45) Date of Patent: Jun. 18, 2013

(54) COLLABORATIVE FILTERING-BASED RECOMMENDATIONS

(75) Inventor: Ashish Sureka, Bangalore (IN)

(73) Assignee: Infosys Limited, Bangalore (IN)

( * ) Notice: Subject to any disclaimer, the term of this patent is extended or adjusted under 35 U.S.C. 154(b) by 1014 days.

(21) Appl. No.: 11/765,377

(22) Filed: Jun. 19, 2007

(65) Prior Publication Data

US 2008/0010258 A1 Jan. 10, 2008

(30) Foreign Application Priority Data

Jun. 22, 2006 (IN) .......................... 1061/CHE/2006

(51) Int. Cl.
*G06F 17/00* (2006.01)

(52) U.S. Cl.
USPC .......................................................... 707/732

(58) Field of Classification Search
USPC .......................................................... 707/732
See application file for complete search history.

(56) References Cited

U.S. PATENT DOCUMENTS

| | | | | |
|---|---|---|---|---|
| 5,704,017 A * | 12/1997 | Heckerman et al. | ............ | 706/12 |
| 5,884,282 A * | 3/1999 | Robinson | ......................... | 705/27 |
| 6,041,311 A * | 3/2000 | Chislenko et al. | .............. | 705/27 |
| 6,049,777 A * | 4/2000 | Sheena et al. | ................... | 705/10 |
| 6,064,980 A * | 5/2000 | Jacobi et al. | ..................... | 705/26 |
| 6,092,049 A * | 7/2000 | Chislenko et al. | .............. | 705/10 |
| 6,266,649 B1 | 7/2001 | Linden et al. | | |
| 6,321,179 B1 * | 11/2001 | Glance et al. | ................. | 702/189 |
| 6,356,879 B2 | 3/2002 | Aggarwal et al. | | |
| 6,389,372 B1 | 5/2002 | Glance et al. | | |
| 6,487,539 B1 * | 11/2002 | Aggarwal et al. | .......... | 705/14.23 |
| 6,687,696 B2 * | 2/2004 | Hofmann et al. | ................. | 707/6 |
| 6,947,922 B1 | 9/2005 | Glance | | |
| 6,981,040 B1 * | 12/2005 | Konig et al. | ................... | 709/224 |
| 7,113,917 B2 * | 9/2006 | Jacobi et al. | ............... | 705/14.53 |
| 2001/0021914 A1 * | 9/2001 | Jacobi et al. | ...................... | 705/8 |
| 2002/0065721 A1 | 5/2002 | Lema et al. | | |
| 2002/0065797 A1 | 5/2002 | Meidan et al. | | |
| 2002/0099519 A1 | 7/2002 | Srivastava | | |
| 2002/0107853 A1 * | 8/2002 | Hofmann et al. | ................. | 707/7 |
| 2002/0161664 A1 * | 10/2002 | Shaya et al. | ..................... | 705/26 |
| 2003/0051240 A1 * | 3/2003 | Schaffer et al. | .................. | 725/34 |
| 2003/0055816 A1 * | 3/2003 | Paine et al. | ........................ | 707/3 |
| 2003/0105682 A1 * | 6/2003 | Dicker et al. | .................... | 705/27 |
| 2003/0229537 A1 | 12/2003 | Dunning et al. | | |
| 2004/0059626 A1 | 3/2004 | Smallwood | | |
| 2004/0176966 A1 * | 9/2004 | Chen | ................................. | 705/1 |
| 2004/0210533 A1 | 10/2004 | Picker et al. | | |
| 2004/0243604 A1 * | 12/2004 | Gross | ............................ | 707/100 |
| 2005/0131897 A1 | 6/2005 | Grasso et al. | | |

(Continued)

OTHER PUBLICATIONS

Adomavicius et al., "Towards the Next Generation of Recommender Systems: A Survey of the State-of-the-Art and Possible Extensions," *IEEE Transactions on Knowledge and Data Engineering*, vol. 17, No. 6, (2005) pp. 734-749, 16 pages.

(Continued)

*Primary Examiner* — Syed Hasan
*Assistant Examiner* — Kurt Mueller
(74) *Attorney, Agent, or Firm* — Klarquist Sparkman, LLP

(57) ABSTRACT

Various techniques can be used to implement a collaborative filtering-based recommendation engine. For example, different similarity measures can be used for different users. Different similarity measures can be used for a particular user across time. A superior similarity measure can be found for a user. User-defined similarity measures can be supported.

15 Claims, 18 Drawing Sheets

U.S. PATENT DOCUMENTS

2005/0193002 A1   9/2005  Souders et al.
2009/0006373 A1*  1/2009  Chakrabarti et al. ............. 707/5
2010/0042460 A1*  2/2010  Kane, Jr. ........................... 705/9

OTHER PUBLICATIONS

Ahn, Hyung Jun, A new similarity measure for collaborative filtering to alleviate the new user cold-starting problem, *Information Sciences: an International Journal*, vol. 178, Issue 1, Jan. 2008, pp. 37-51, 15 pages.

Breese et al., "Empirical Analysis of Predictive Algorithms for Collaborative Filtering," *Proceedings of the 14th Conference Uncertainty in Artificial Intelligence*, (1998), 21 pages.

Fu et al., "The effect of similarity measure on the quality of query clusters," *Journal of Information Science*, vol. 30, No. 5 (2004), pp. 396-407, 22 pages.

Herlocker et al., "An Algorithmic Framework for Performing Collaborative Filtering," *Proceedings of the 22nd ACM SIGIR conference on Research and development in information retrieval*, (SIGIR 1999), pp. 230-237, 8 pages.

Herlocker et al., "An Empirical Analysis of Design Choices in Neighborhood-Based Collaborative Filtering Algorithms," *Information Retrieval*, vol. 5, No. 4, Oct. 2002, pp. 287-310, 24 pages.

Linden et al., "Amazon.com recommendations: item-to-item collaborative filtering," *IEEE Internet Computing*, vol. 7, Issue 1, Jan./Feb. 2003, pp. 76-80, 5 pages.

Mobasher et al., "Improving the effectiveness of collaborative filtering on anonymous Web usage data," In *Proceedings of the IJCAI 2001 Workshop on Intelligent Techniques for Web Personalization (ITWP01)*, Aug. 2001, 8 pages.

Nichols, David M., "Implicit Rating and Filtering," In *Proceedings of the 5th DELOS Workshop on Filtering and Collaborative Filtering*, Budapest, Hungary, Nov. 10-12, 1997, ERCIM, 31-36, ISBN: 2-912335-04-3, 6 pages.

Papagelis et al., "Qualitative Analysis of User-based and Item-based Prediction Algorithms for Recommendation Systems," *Proceedings of the 3rd Hellenic Data Management Symposium (HDMS 2004)*, 10 pages.

Sarwar et al., "Item-based collaborative filtering recommendation algorithms," In *Proceedings of the 10th International World Wide Web Conference (WWW10)* Hong Kong, May 2001, pp. 285-295, 11 pages.

Spertus et al., "Evaluating Similarity Measures: A Large-Scale Study in the Orkut Social Network," *The Eleventh ACM SIGKDD International Conference on Knowledge Discovery and Data Mining*, Chicago, IL, Aug. 2005, pp. 678-674, 7 pages.

Symeonidis et al., "Collaborative Filtering: Fallacies and Insights in Measuring Similarity," *Proceedings of the PKDD Workshop on Web Mining (WebMine 2006)* Berlin, Germany, Sep. 2006, pp. 56-67, 12 pages.

"Collaborative Filtering," Wikipedia, visited Jun. 11, 2007, (6 pages).

Herlocker et al., "An Algorithmic Framework for Performing Collaborative Filtering," *Proceedings of the 1999 Conference on Research and Development in Information Retrieval*, Aug. 1999, (8 pages).

Herlocker et al., "Explaining Collaborative Filtering Recommendations," *Proceedings of ACM 2000 Conference on Computer Supported Cooperative Work*, Dec. 2-6, 2000, (10 pages).

Jin et al., "Collaborative filtering with decoupled models for preferences and ratings," *Proceedings of the 12th International Conference on Information and Knowledge Management*, New Orleans, Louisiana, USA, Nov. 3-8, 2003, (8 pages).

Kohrs et al., "Clustering for collaborative filtering applications," *Proceedings of CIMCA '99, IOS Press*, 1999, (6 pages).

O'Conner et al., "Clustering Items for Collaborative Filtering," *Proceedings of the ACM SIGIR Workshop on Recommender Systems*, 1999, (4 pages).

Sarwar et al., "Item-based Collaborative Filtering Recommendation Algorithms," World Wide Web, 2001, (16 pages), also presented at WWW10, Hong Kong, May 1-5, 2001.

Schafer et al., "E-Commerce Recommendation Applications," *Data Mining and Knowledge Discovery*, Jan. 2001, (24 pages).

Schafer et al., "Recommender Systems in E-Commerce," *ACM Conference on Electronic Commerce*, 1999, (9 pages).

Shardanand et al., "Social Information Filtering: Algorithms for Automating 'Word of Mouth,'" CHI '95, 1995, (8 pages).

Ungar et al., "Clustering Methods for Collaborative Filtering," *Proceedings of the Workshop on Recommendation Systems*, 1998, (16 pages).

\* cited by examiner

1300

User Preferences

| Film Genres | Weights |
|---|---|
| Action | ☐ |
| Comedy | ☐ |
| Thriller | ☐ |
| War | ☐ |

COLLABORATIVE FILTERING-BASED RECOMMENDATIONS

BACKGROUND

Recommender systems have become more widespread as the number of item choices available to an E-commerce customer increases. Recommender systems can be beneficial to both seller and buyer by matching up a customer with items that are most likely to be of interest.

However, current recommender systems are deficient in various aspects.

SUMMARY

A variety of techniques can be used for providing recommendations via collaborative filtering.

For example, different similarity measures can be applied to different users in a collaborative filtering-based recommendation scenario.

A similarity measure can be determined for a particular user by finding the similarity measure exhibiting the best performance.

A different similarity measure can be applied to the same user across time.

A user-defined similarity measure can also be supported.

The techniques described herein can be implemented to provide a flexible and dynamic approach to collaborative filtering.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 13 is a sample graphical user interface to elicit user preferences for defining a customized (e.g., user-defined) similarity measure.

DETAILED DESCRIPTION

Example 1

Exemplary System Employing a Combination of the Technologies

Figure 1:
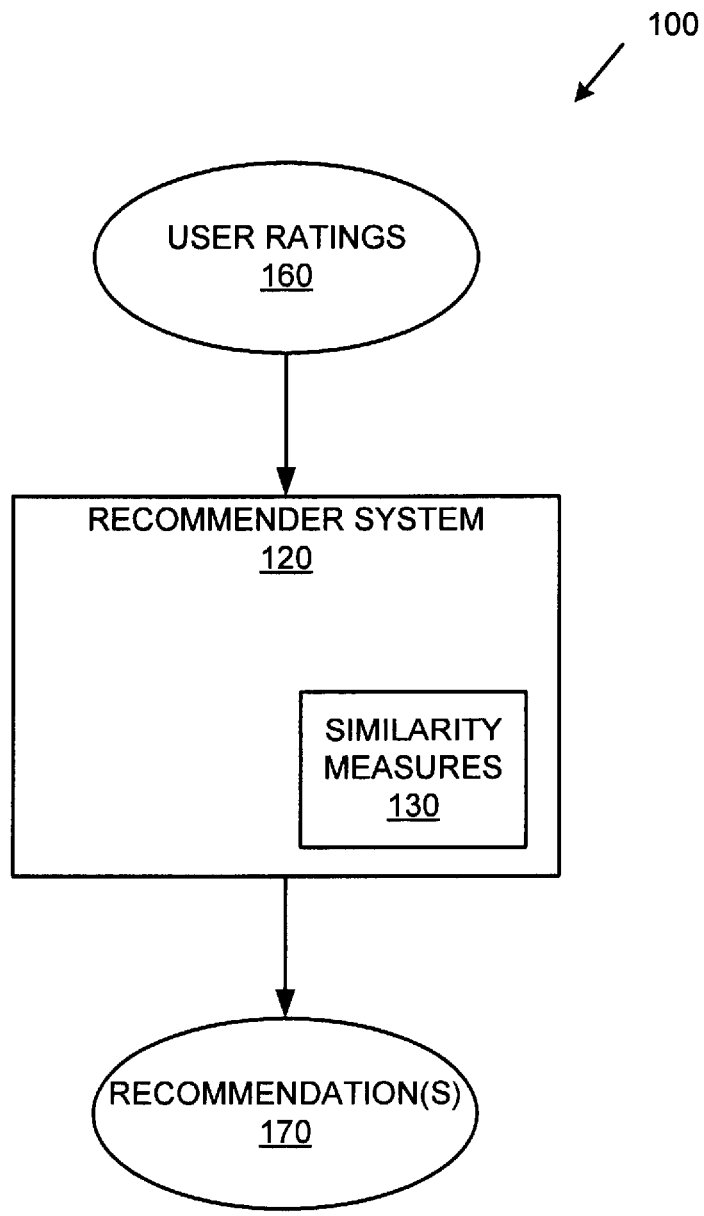
FIG. 1 is a block diagram of an exemplary system implementing a recommender system.

FIG. 1 is a block diagram of an exemplary system 100 implementing a recommender system 120. The system 100 and variants of it can be used to perform any of the methods described herein.

In the example, the recommender system 120 uses a plurality of user similarity measures 130. The recommender system 120 accepts user ratings 160 for a plurality of users, which are processed via one or more similarity measures 130 to perform collaborative filtering that generates one or more recommendations 170.

In practice, the system 100 can be more complicated, with additional inputs, outputs, and the like.

Example 2

Exemplary Method of Providing Recommendations

Figure 2:
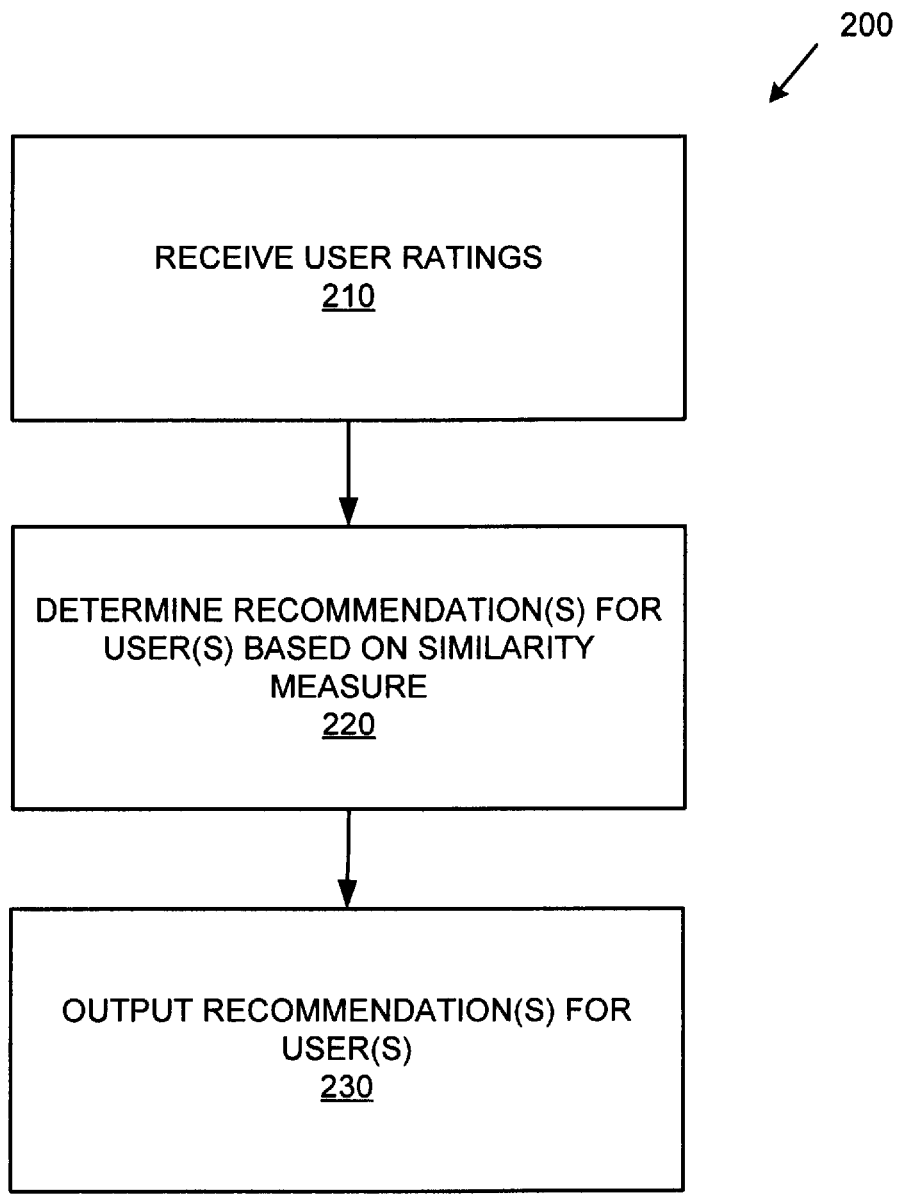
FIG. 2 is a flowchart of an exemplary method of providing recommendations via collaborative filtering and can be implemented, for example, in a system such as that shown in FIG. 1.

FIG. 2 is a flowchart of an exemplary method 200 of providing recommendations via collaborative filtering and can be used in any of the examples herein.

At 210, a plurality of user ratings are received.

At 220, one or more recommendations are determined for one or more users via collaborative filtering based on a similarity measure. As described herein, different similarity measures can be used for different users. Similarly, different similarity measures can be used for a same user over time. User-defined similarity measures can also be supported.

At 230, the recommendations are outputted for the one or more users.

The described actions can be performed by a recommender system, a plug in to the recommender system, or both.

Example 3

Exemplary System Providing a Recommendation for a User

Figure 3:
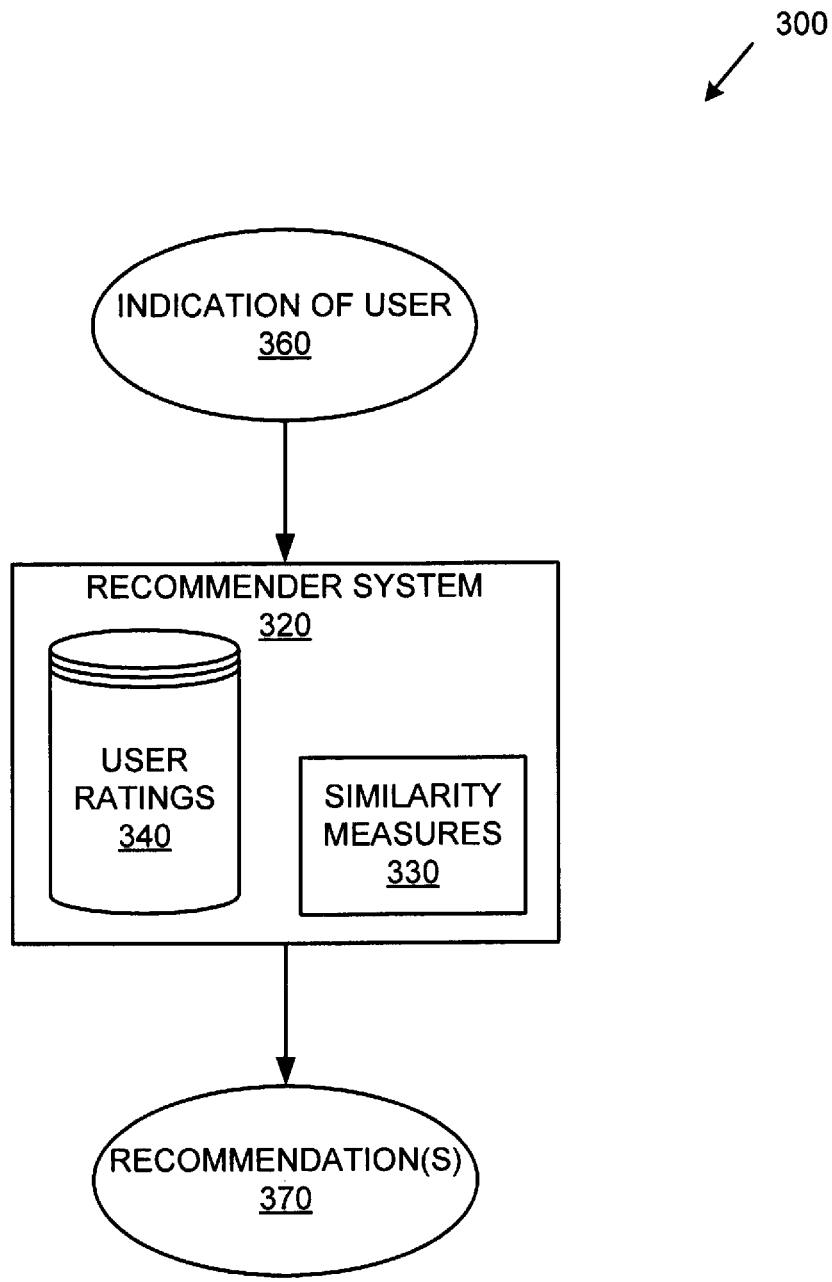
FIG. 3 is a block diagram of an exemplary system for providing one or more recommendations for a user.

FIG. 3 is a block diagram of an exemplary system 300 for providing one or more recommendations for a user.

In the example, an indication 360 of a user is received by the recommender system 320, which applies a collaborative filtering technique to the stored user ratings 340 and similarity measures 330 to provide one or more recommendations 370.

Example 4

Exemplary Method of Providing a Recommendation for a User

Figure 4:
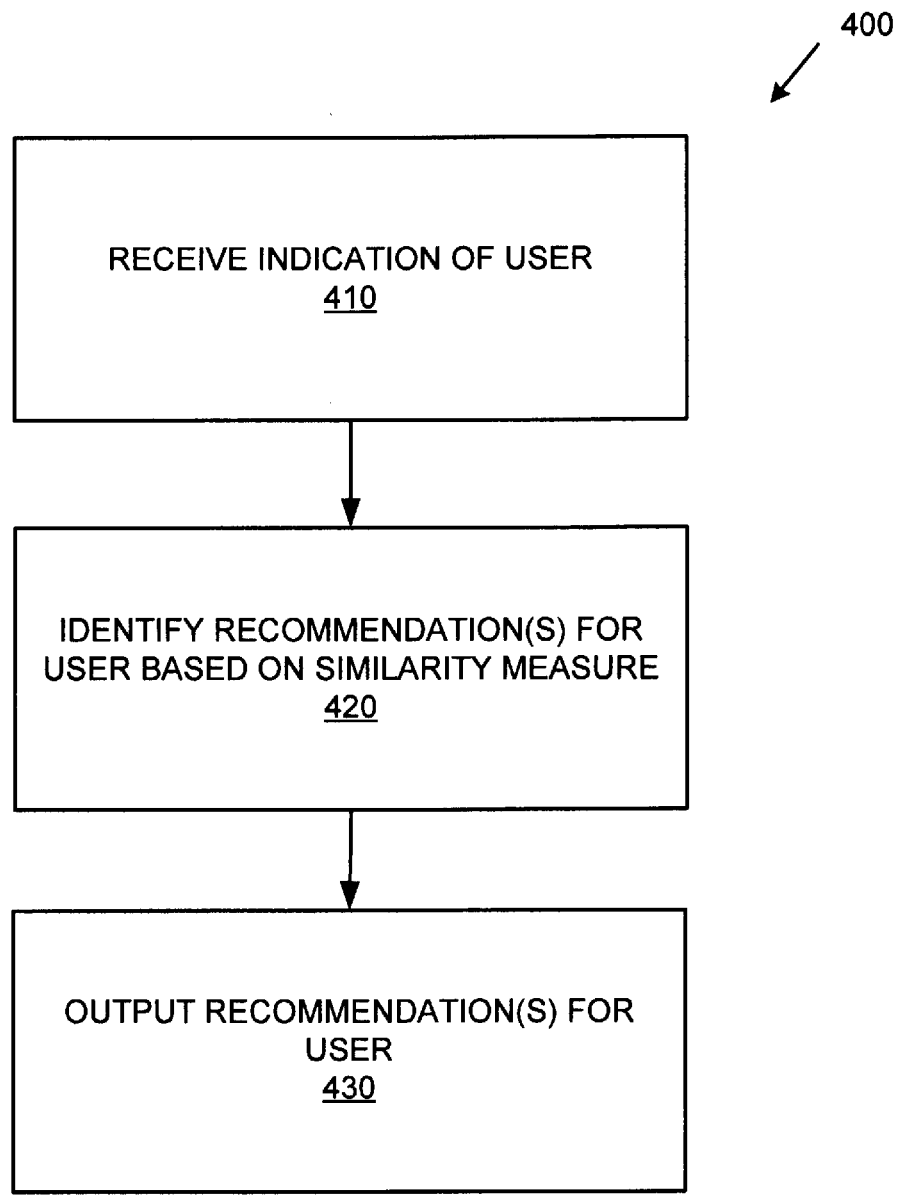
FIG. 4 is a flowchart of an exemplary method of providing a recommendation for a user.

FIG. 4 is a flowchart 400 of an exemplary method of providing a recommendation for a user.

At 410, an indication of a user is received.

At 420, one or more recommendations are identified for the user with collaborative filtering via a similarity measure.

At 430, the one or more recommendations for the user are output.

Although the actions in the method 410 can be performed on demand (e.g., on an ad hoc basis), it is also possible to perform some of them ahead of time. For example, the similarity measure can be applied before the indication of the user is received. The recommendation can then be provided responsive to the received indication of the user based on pre-calculated information determined by the similarity measure.

Example 5

Exemplary Users

In any of the examples herein, a user can be any person interacting with the system via a human-computer interface. In practice, users can be indicated (e.g., represented) as usernames, user identifiers, or the like.

Example 6

Exemplary Items

In any of the examples herein, an item can be any recommendable product or service. For example, items can be movies, music, travel packages, restaurants, news articles, books, or any other products and services. Items can be purchasable products (e.g., available for sale at an E-commerce storefront that provides recommendations for items).

In practice, an item can be represented as a description, item number, or some other item identifier.

Example 7

Exemplary Recommendations

In any of the examples herein, a recommendation for an item can take any of a variety of forms. For example, a recommended item can be presented as an option for selection, display, activation, or purchase.

In practice, an item recommendation can be outputted as an item identifier. For example, a recommender subsystem can provide the item identifier as output to another system that displays the recommended item (e.g., in an E-commerce scenario). The recommendation can also be provided for display to a user in the form of a picture, icon, hyperlink, or the like. Accompanying the presentation can be an explanation of the recommendation (e.g., "We recommend . . . " "Others with your tastes bought . . . " or the like).

Example 8

Exemplary User Ratings

In any of the examples herein, a user rating can be any implicit or explicit rating acquired for the user (e.g., from the user). For example, a user can fill out a survey indicating an explicit rating (e.g., poor, OK, excellent) for one or more items that indicates whether the user liked the items (e.g., whether an item comports with the user's taste). Or, ratings can be implicit (e.g., indicated by repeat purchases or selection of an item or recommendations to others). In practice, the rating can be represented by a rating value (e.g., a number).

Example 9

Exemplary Similarity Measures

In any of the examples herein, any of a variety of measures of similarity between or among users can be used. Such measures or metrics are sometimes called "user similarity measures" or simply "similarity measures" herein. Examples of such measures include the Pearson Correlation Coefficient, Jacobian distance, Euclidean distance, Manhattan distance, a custom similarity measure, and the like. It is expected that additional measures can be developed in the future and incorporated into the technologies described herein.

In practice, the similarity measure can be implemented as a similarity function that provides a value indicating distance between users (e.g., a proximity distance between two users). For example, a low value can indicate that two users are close to each other. In this way, the k nearest neighbors of a user (e.g., a neighborhood of the user) can be found. Various shortcuts and optimizations can be employed to reduce the resources when employing the similarity measure.

Example 10

Exemplary Incorporation into Single System

In any of the examples herein, the technologies can be implemented in a single system over the lifecycle of the system. Similarly, the technologies can be implemented in a single recommendation engine over the lifecycle of the engine.

Example 11

Exemplary System Employing User Similarity Measure Mapping

Figure 5:
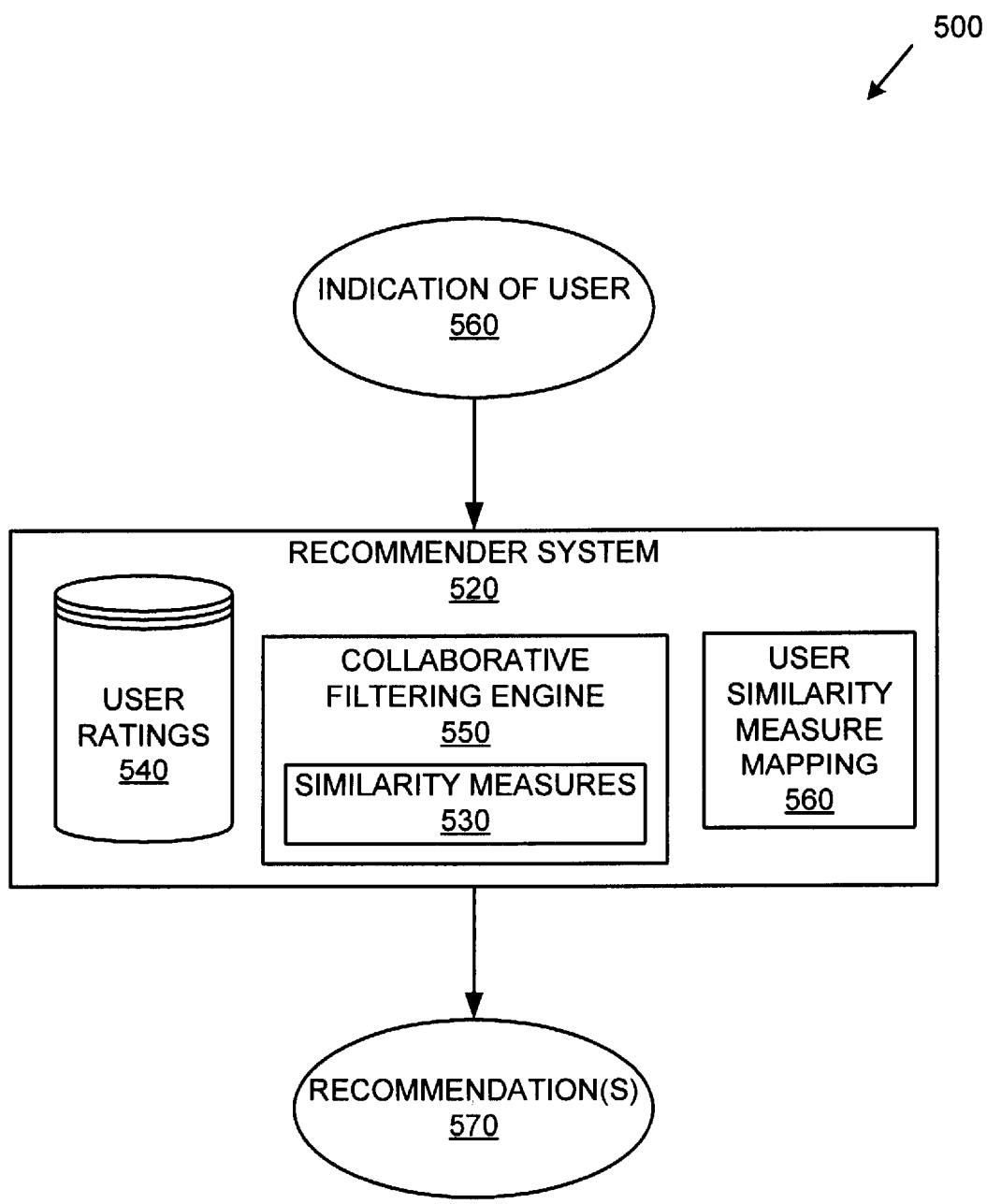
FIG. 5 is a block diagram of an exemplary system that includes a user-to-similarity measure mapping.

FIG. 5 is a block diagram of an exemplary system 500 that includes a user-to-similarity measure mapping. In the example, a recommender system 520 is configured to accept an indication 560 of a user as input and output one or more recommendations 570 for the user.

The recommender system 520 includes user ratings 540 and a collaborative filtering engine 550 that can use a plurality of user similarity measures 530.

A user-to-similarity measure mapping 560 maps a user to a user similarity measure. As described herein, different users can be mapped to different similarity measures. A single user can be mapped to different similarity measures over time, and user-defined similarity measures can be supported.

The collaborative filtering engine 550 can be configured to apply the different similarity measures 530 for the different users against the plurality of user ratings 540 for a plurality of items and generate one or more recommendations 570 therefrom.

Example 12

Exemplary Method of Identifying Recommendations

Figure 6:
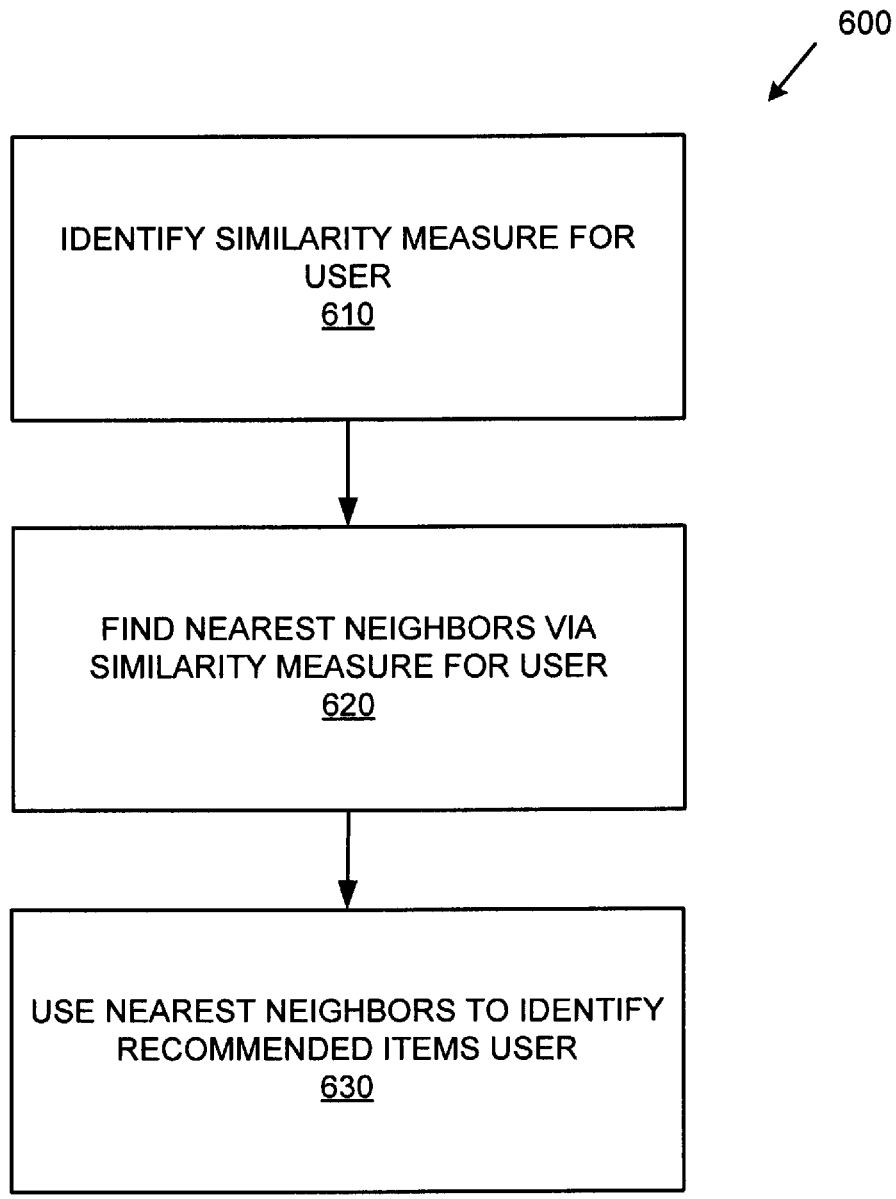
FIG. 6 is a flowchart of an exemplary method of identifying recommendations via a similarity measure.

FIG. 6 is a flowchart of an exemplary method 600 of identifying recommendations via a similarity measure.

At 610 a user similarity measure for a user is identified. For example, the mapping described herein can be consulted to identify a user similarity measure associated with a particular user.

At 620, the nearest neighbors for the user are identified via the user similarity measure. For example, the k nearest neighbors can be identified. These neighbors are sometimes called the "neighborhood" for the user. In practice, the neighborhood is treated as those users having similar tastes to the user in question.

At 630, the nearest neighbors are used to identify one or more recommended items for the user. For example, if the nearest neighbors indicate high ratings for an item (e.g., not yet considered or purchased by the user), the item can be outputted as a recommendation for the user. Closer neighbors can have more influence over the recommendations.

The actions shown in the method 600 can be performed ahead of time (e.g., in the background). In this way, when a request for a recommendation is received, less processing can be done to determine the one or more recommendations.

Example 13

Exemplary Different Similarity Measures

Figure 7:
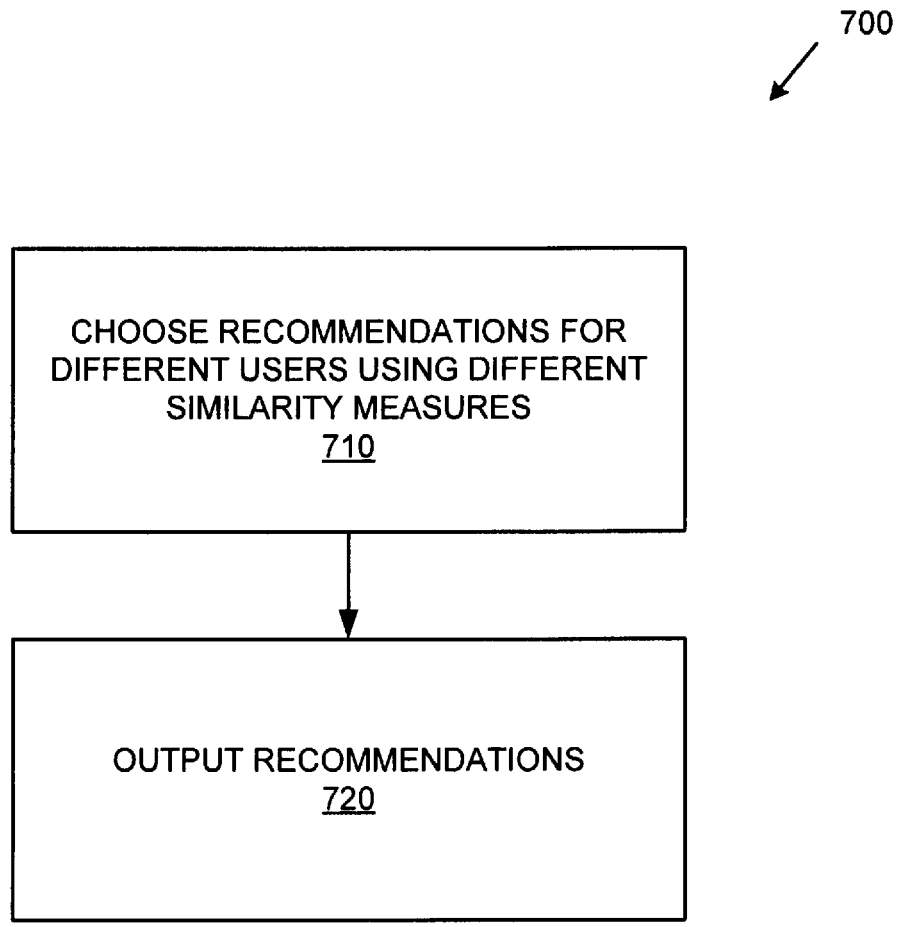
FIG. 7 is a flowchart of an exemplary method of choosing item recommendations for different users via different similarity measures.

FIG. 7 is a flowchart of an exemplary method 700 of choosing item recommendations for different users via different similarity measures.

At 710, item recommendations for different users are chosen (e.g., identified from among possible items) for different users via different user similarity measures (e.g., when applying collaborative filtering for the different users).

As described herein, the similarity measure for a particular user can be selected via a stored mapping between users and similarity measures.

Thus, a first recommendation for a first user can be chosen via collaborative filtering using a first user similarity measure, and a second recommendation for a second user can be chosen via collaborative filtering using a second user similarity measure different from the first.

Thus, a similarity measure can be designated for one user independently of other users. A per-user configurable similarity measure can be used.

At 720, the recommendations are outputted.

Example 14

Exemplary Different Similarity Measures for a User

In any of the examples described herein, item recommendations for a same user can be chosen via different user similarity measures when applying collaborative filtering for the same user at different times. Meanwhile, item recommendations for one or more other users can be chosen independently of the different user similarity measures (e.g., via a same user similarity measure or different similarity measures).

Figure 8:
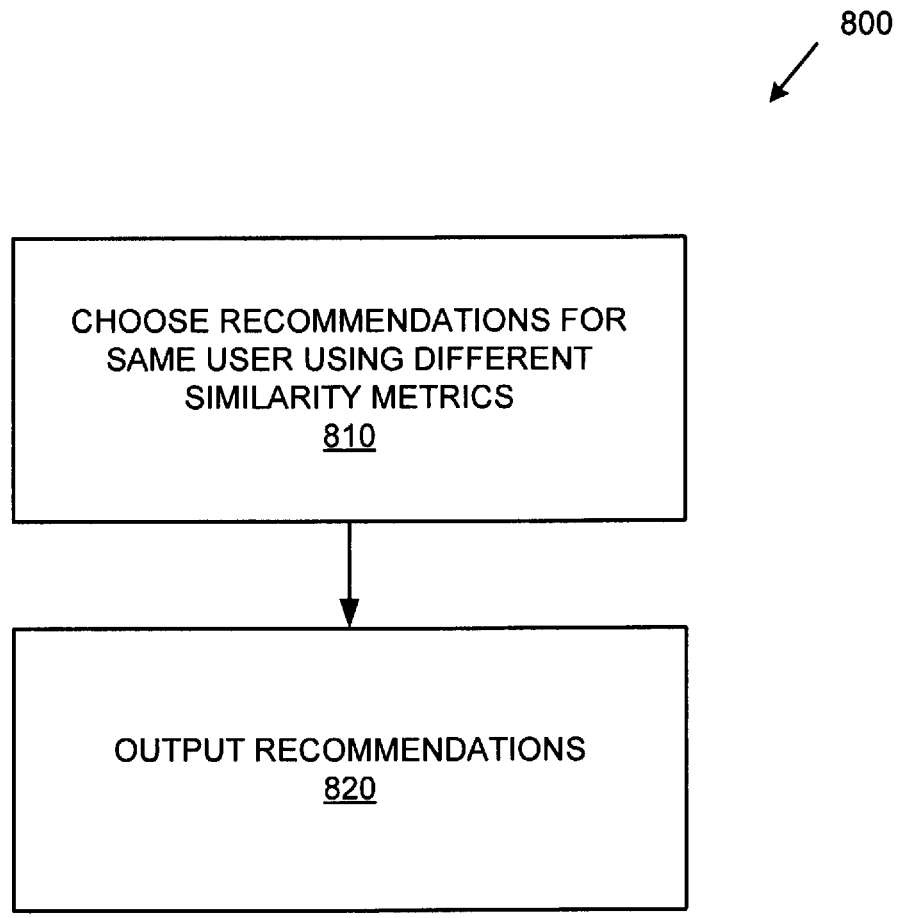
FIG. 8 is a flowchart of an exemplary method of using different similarity measures for a user.

FIG. 8 is a flowchart of a method 800 of using different similarity measures for a user. At 810, recommendations for a same user are chosen using different similarity measures.

At 820, recommendations are outputted for the same user (e.g., at different times).

As described herein, the similarity measure for the user can be selected via a stored mapping between users and similarity measures. For example, the mapping can change over time to implement the described method.

Thus, a first recommendation for a first user can be chosen via collaborative filtering using a first user similarity measure, and a second recommendation for the same user can be chosen via collaborative filtering using a second user similarity measure different from the first.

The user similarity measure for a single user can thus change over time. The system can switch between or among different similarity measures without having to re-code. The similarity measure for a single user can change while keeping the similarity measure for one or more other users the same.

Example 15

Exemplary Selection of User Similarity Measure a User

In any of the examples described herein, a user similarity measure can be selected out of a plurality of user similarity measures for use when choosing item recommendations for a user. For example, the user similarity measure can be selected based on performance of the user similarity measure (e.g., for the particular user).

Figure 9:
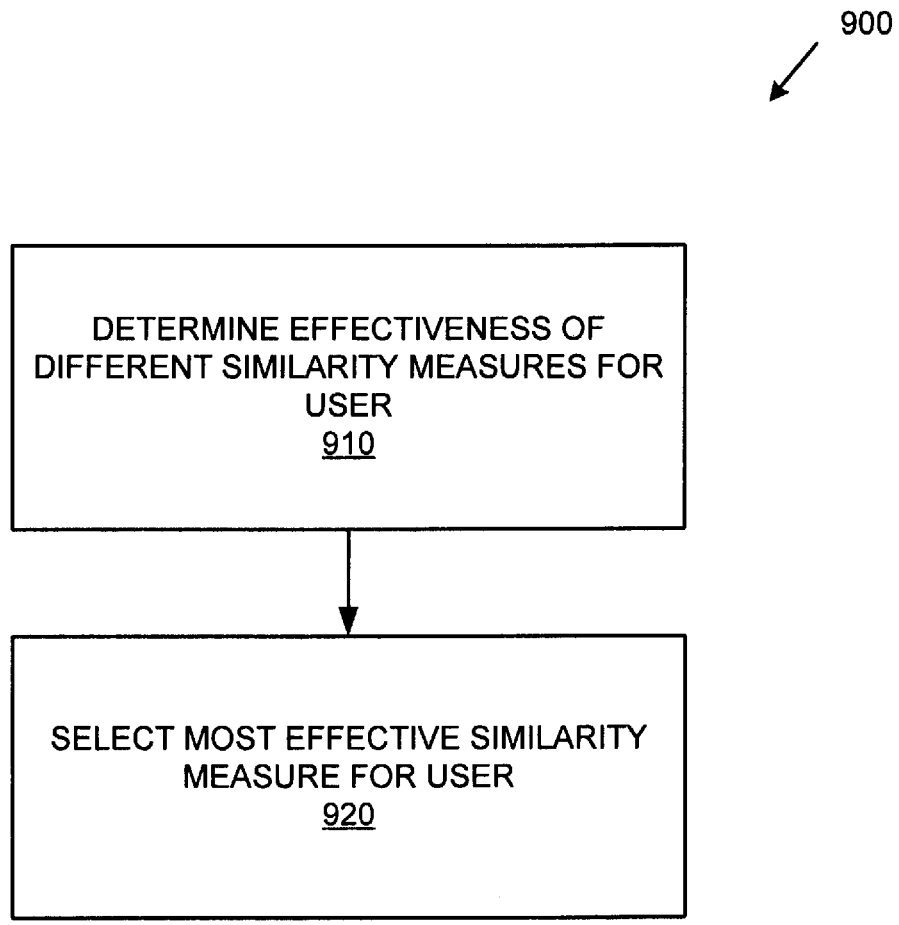
FIG. 9 is a flowchart of an exemplary method of selecting a user similarity measure for a user.

FIG. 9 is a flowchart of an exemplary method 900 of selecting a user similarity measure for a user.

At 910, effectiveness (e.g., performance) measures of different user similarity measures for a user are determined. For example, the user similarity measures can be tested by using them to predict the ratings for a hold out set of user ratings for items.

At 920, the most effective (e.g., best performing) user similarity measure is selected for the user. An indication of the similarity measure can be stored as associated with the user (e.g., via a user-to-similarity measure mapping).

The similarity measure can then be used for collaborative filtering to generate one or more recommendations for the user.

A separate module can be used to determine the best similarity measure for each of a plurality of users. The recommendation engine can receive a directive to use a particular similarity measure for a particular user and will do so in response to the directive.

Example 16

Exemplary User Preferences for Similarity Measure

In any of the examples herein, a user can indicate a preferred user similarity measure. A user can also indicate a user-defined user similarity measure.

Figure 10:
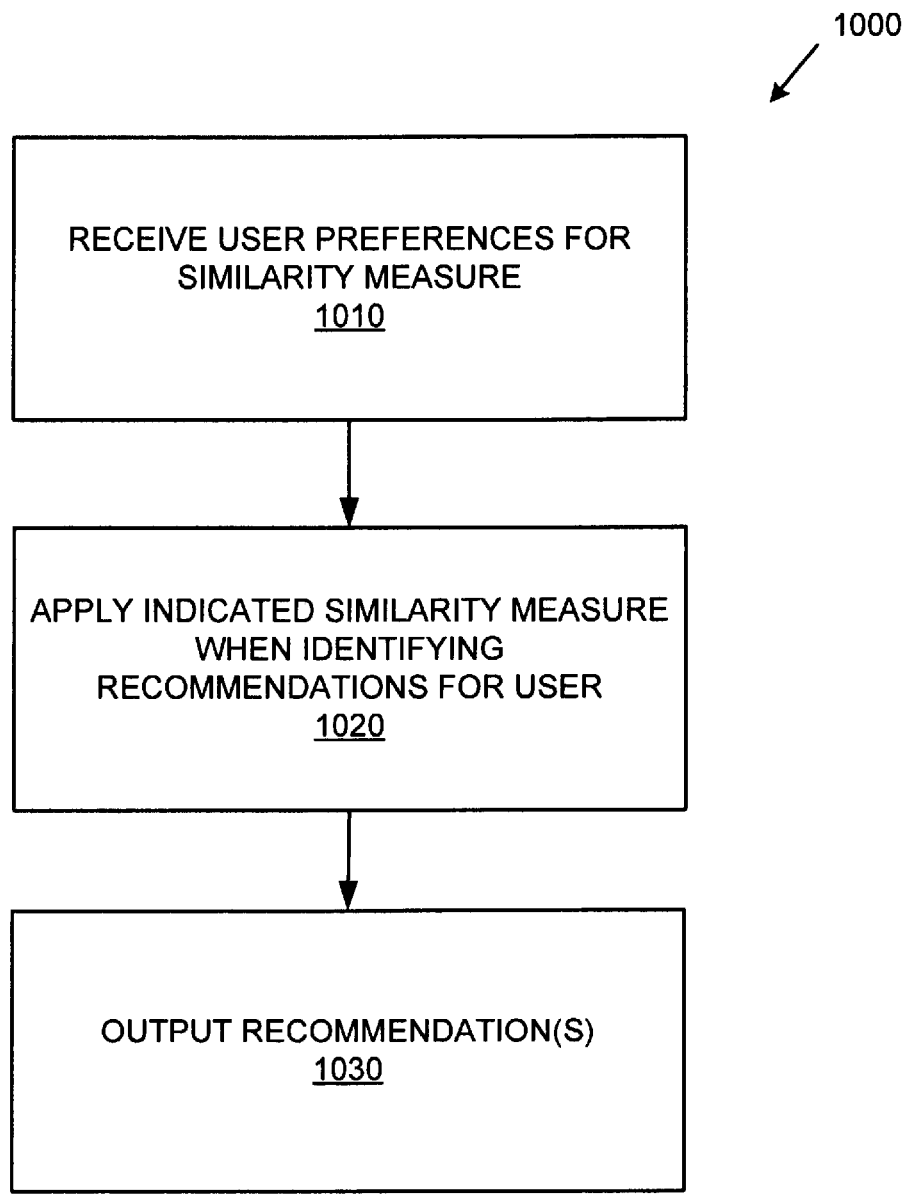
FIG. 10 is a flowchart of an exemplary method of processing user preferences for a similarity measure.

FIG. 10 is a flowchart of an exemplary method 1000 of processing user preferences for a similarity measure.

At 1010, user preferences for a user similarity measure are received (e.g., from a user interface presented to the user). The preferences can be stored for future reference. The preference can take the form of a chosen measure or a customized (e.g., user-defined) similarity measure or function. For example, a user can provide values from which a function is derived.

At 1020, the similarity measure is applied when generating one or more recommendations for the user.

At 1030, the one or more recommendations are outputted.

The user can indicate a user-defined similarity measure. For example, the user can indicate a plurality of user-defined weight values (e.g., for particular items, categories of items, item genres, or the like). The user-defined measure can then be applied when generating recommendations (e.g., the weights can be applied to items of the indicated categories).

Any number of other user-defined similarity measures can be supported.

Example 17

Exemplary User to Similarity Measure Mapping

The user to similarity mapping can be implemented via a data structure encoded on one or more computer-readable media. The data structure can associate users with respective user similarity measures.

For example, the data structure can include an indication of a user and an indication of a similarity function or measure associated with the user and designated for application when performing collaborative filtering (e.g., determining a neighborhood of similar users) in a recommender system configured to provide item recommendations for the user.

The data structure can support multiple users. So, it can include indications of a plurality of users and indications of similarity functions designated to be applied for respective users.

The similarity function indicated can indicate a user-defined function defined by the user. Or, for user-defined measures, the data structure need not indicate a measure.

Example 18

Exemplary Implementation

The similarity measures described herein can be applied for collaborative filtering. The similarity measure can be a function that computes the distance or the magnitude of correlation between the ratings or opinions of two users. The function can take as input the rating data of two users and compute a numerical value as an output signifying the degree of similarity or dissimilarity of interests (e.g., tastes) between two users.

In general, a similarity measure or distance function can basically be a type of scoring function that determines the strength of relationship between two objects, data points, vectors, or feature sets. Computing similarity between two data points can be used in any collaborative filtering algorithm. There are many similarity or distance functions; they have their own characteristics and significance.

Example 19

Exemplary Similarity

The recommender system can compare the interests and opinions of two human beings, but the notion of similarity can be subjective. Each person can have their own definition of similarity. The technologies described herein can enable a user to specify their own similarity function, which provides flexibility.

Example 20

Exemplary Application of Different Similarity Measures

In terms of mathematical notation, let there be N users, where a user is represented as $U_i$, where i varies from 1 to N. The similarity measure S used for finding neighbors for respective users i need not be fixed and kept the same for all users; the similarity measure can change with time.

Figure 11:
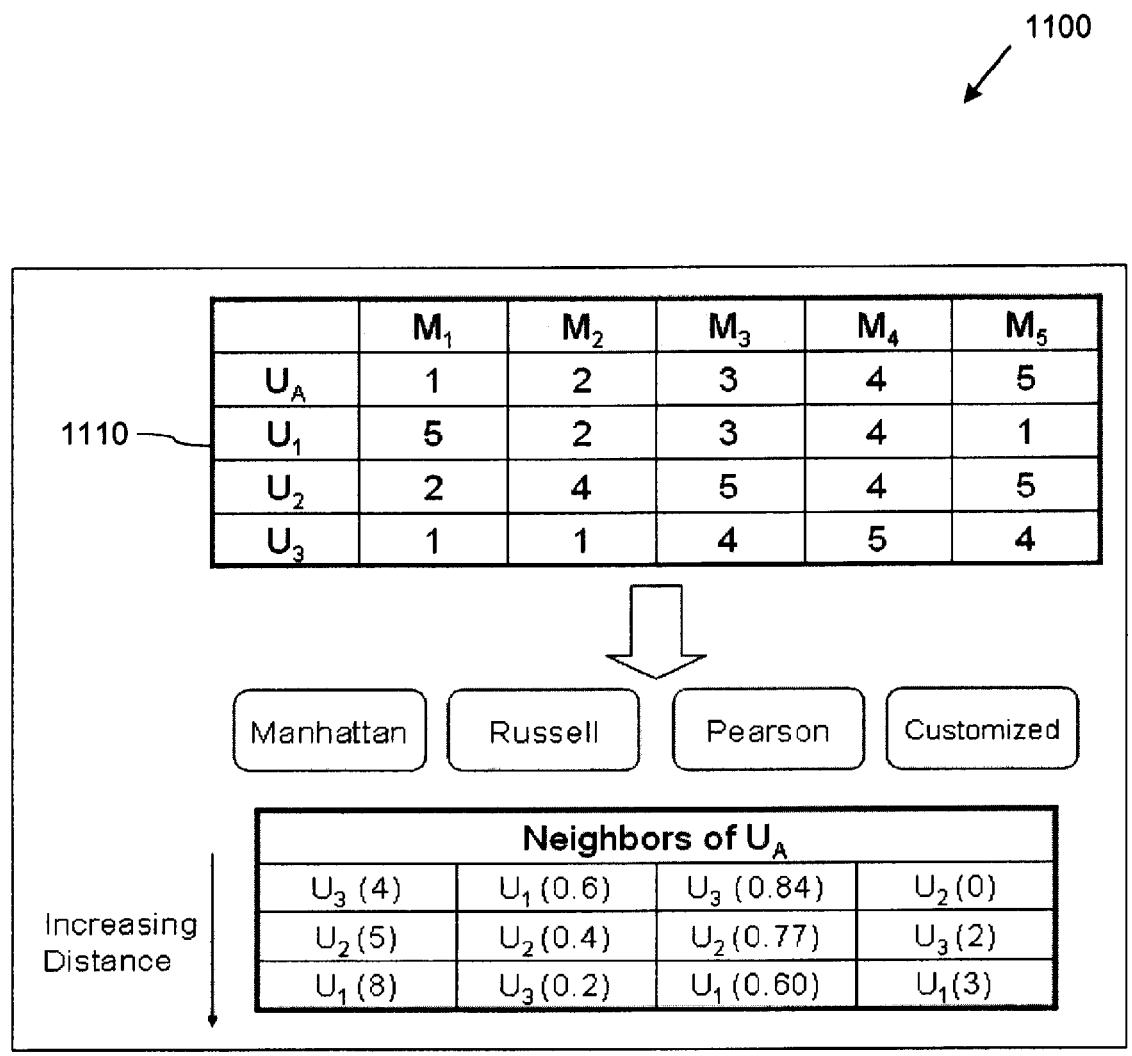
FIG. 11 is an illustration of application of different similarity measures that produce different results.

FIG. 11 shows a scenario 1100 that illustrates the limitation of fixed similarity measures by illustrating the application of different similarity measures that result in different values and order of distances between an active user and other users. FIG. 11 shows a ratings database 1110. The rating data has four users and five products and the users' ratings for the products. Manhattan, Russell, and Pearson Correlation Coefficients are possible correlation measures.

User $U_a$ in FIG. 11 is denoted as an active user (i.e., a user whose distances with other users is to be determined). Applying the formula of Manhattan distance results in the distance between user $U_a$ and user $U_1$, $U_2$, $U_3$ to be 8, 5, and 4, respectively. Hence, according to the Manhattan distance similarity measure, user $U_3$ is closer to user $U_a$ than user $U_1$. Whereas, applying the formula for Russell and Pearson Correlation results in different answers. According to the Russell similarity measure, user $U_1$ is closer to user $U_a$ as compared to user $U_3$. The ratings of all K users that are neighboring to the active user and the distance between the neighboring users and active users can determine the predicted rating of the active user for a particular product. For example, the nearer a user is to the active user, the more impact it can have in computing the predicted rating of the active user for a particular product.

In the example, user $U_3$ plays a higher role in determining the future ratings of the active user while using Manhattan distance as a similarity measure, whereas user $U_1$ plays a higher role while using Russell distance as the similarity measure. There can be uncertainty as to which similarity measure is the best metric for determining nearness for a particular user.

FIG. 11 also illustrates the consequences of applying a customized or a user-defined similarity measure. For example, the active user can give higher weightings to his ratings for movies $M_4$ and $M_5$. This translates to saying that the active user conveys to the system that his ratings for movies $M_4$ and $M_5$ should be given higher weight when determining similar users, as compared to ratings for other movies.

To make the calculations simple, assume a weight of 1 to movies $M_4$ and $M_5$ and a weight of 0 for all other movies. Applying Manhattan distance results in User $U_2$ being closest to the active user $U_a$. Thus, by applying different similarity measures can potentially result in different sets of user neighborhoods as well as different values for predicted ratings. In practice, there may be no single similarity measure that gives the best predictive accuracy for all types of users. It may happen that a particular similarity measure gives best overall predictive accuracy for the whole system, but the measure may perform poorly for a certain set of the users. Moreover, since the notion of similarity can be quite subjective, the end user can be given an opportunity to express the user's own definition of similarity.

Example 21

Exemplary Progression of Tastes Over Time

Figure 12:
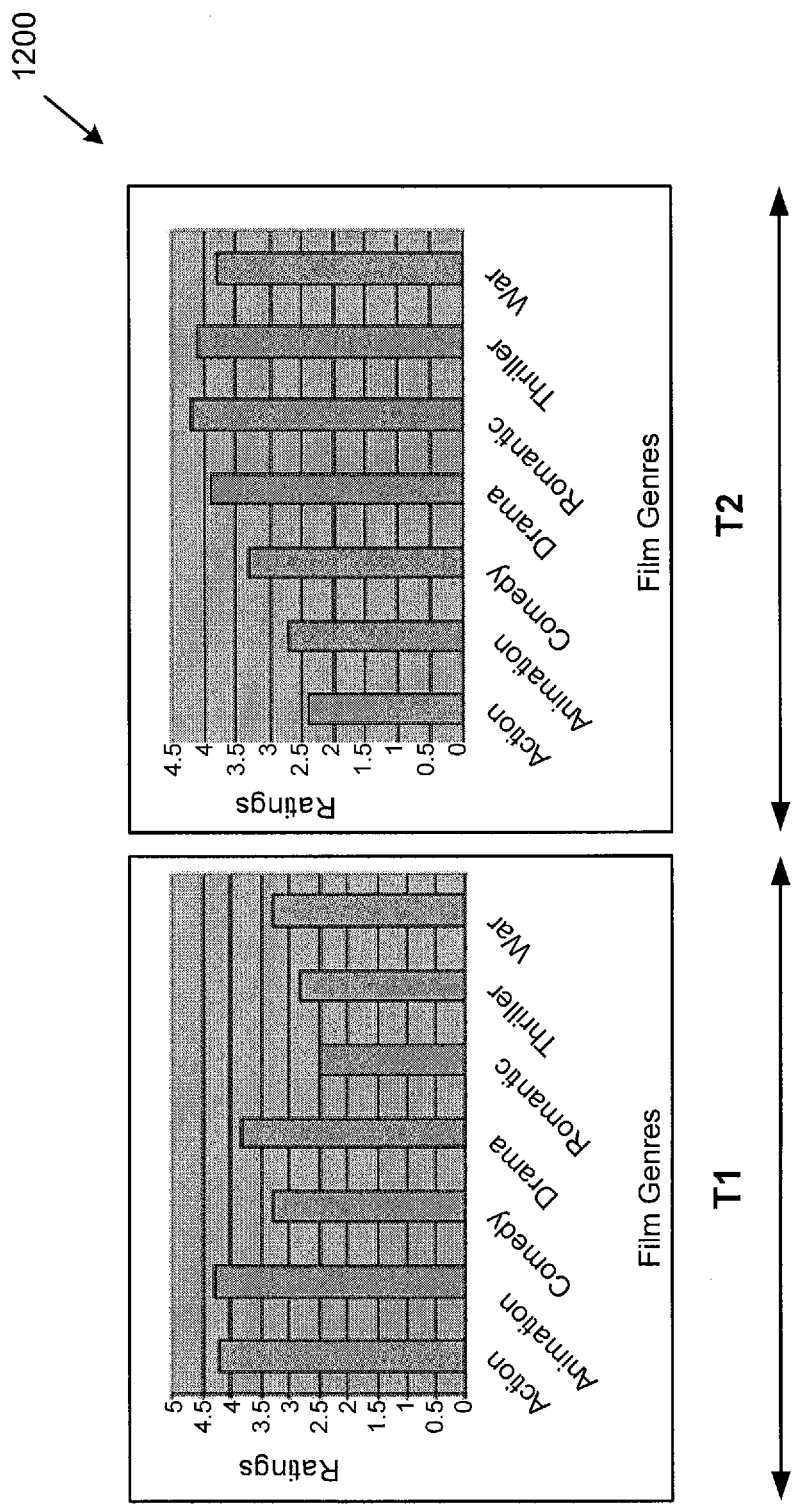
FIG. 12 is a plot of ratings for a user that illustrates change of user tastes over time.

Collaborative filtering technologies need not be constrained by having the similarity measure remain constant over time. FIG. 12 is a plot of ratings for a user that illustrates a scenario 1200 where the tastes of a user change over time. The bar charts of FIG. 12 plot the distribution of average rating of a user for the various film genres across two time intervals. During time interval $T_1$, the user is fonder of action and animation movies as exhibited by his higher average ratings for these film genres. During time interval $T_2$, the user exhibits increased likings toward romantic and thriller movies.

The user can undergo a change in tastes due to external factors, such as age, income, marital status, other environmental changes, and the like. This change in tastes can be taken into account by the system. Since the user has undergone a change in behavior, the user's historical or past ratings at the time of old behavior need not be considered while predicting the ratings of products at the phase where the user has adopted new behavior.

The system can thus model change in likings and disliking to improve the overall quality of the recommendation system.

Example 22

Exemplary User Interface for User-Defined User Similarity Measure

FIG. 13 is a sample graphical user interface 1300 to elicit user preferences for defining a customized (e.g., user-defined) similarity measure. In the example, the user is presented with a screen 1300 that gathers information about the user's preferences for various film genres. The values and the weightings that a user provides can help in customizing the formula for similarity (e.g., distance measures between users). For example, if a user provides a weight of zero to a particular genre, then the films labeled with that genre will not be considered when computing the distance between the rating vectors of the user with other users.

Example 23

Exemplary Recommendation Engine

A recommendation engine can start by gathering user ratings (e.g., ratings for items such as products or services). The ratings can be used in a collaborative filtering technique. For example, the system can ask the users to rate the items they have experienced (e.g., products they have used). A user can provide feedback in the form of an item rating on a defined scale based on the user's experiences with the product.

The rating data can be stored in a backend database. The data analysis can be performed on the rating data populated by eliciting user ratings from a graphical user interface.

The system can optionally ask the user for the user's definition of a similarity measure. Users who are happy and satisfied with the system may not be interested in creating their own version of a similarity measure. However, for example, if the user is not getting good results, the user can be given the option of providing the formula (or elements thereof) to compute the similarity measure to the system.

Figure 14:
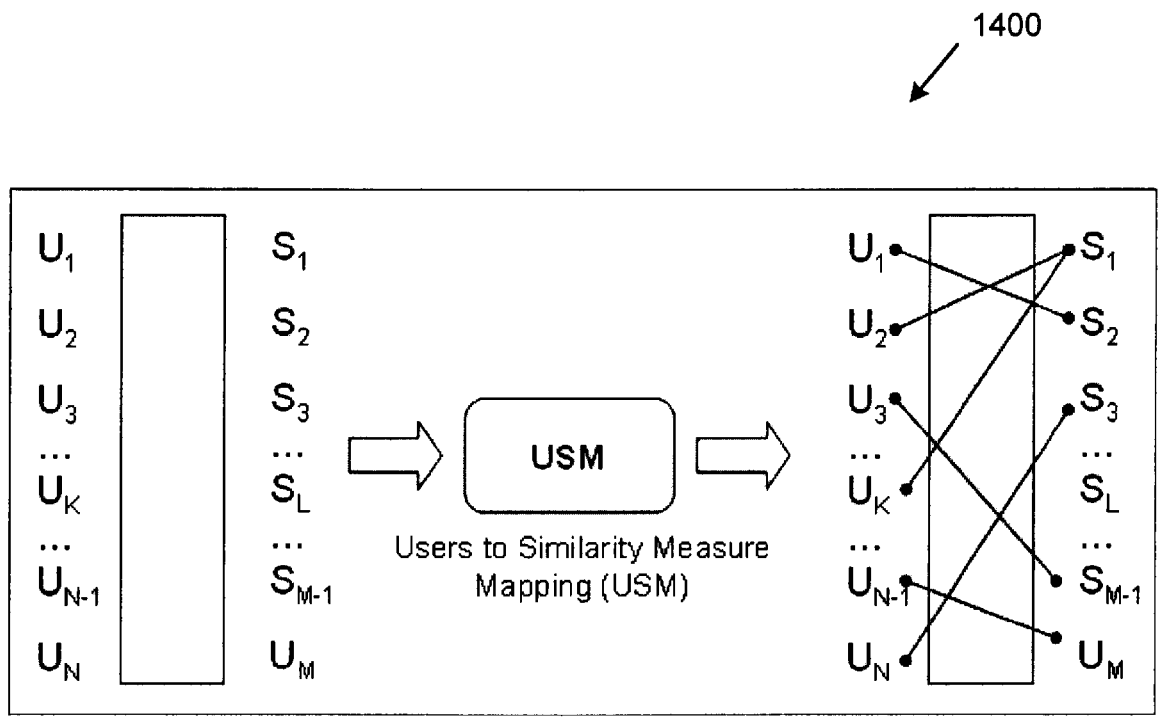
FIG. 14 is an illustration of inputs and outputs to an exemplary User to Similarity Measure Mapping (USM) Module.

The ratings and the user-defined similarity measure can be input by the user and stored in the backend database. Then, a mapping from users to similarity measure can be derived. The module that does the mapping can be called a "User to Similarity Measure Mapping (USM) Module." FIG. 14 shows a system 1400 with various users ($U_{1-N}$) and similarity measures ($S_{1-(M-1)}$ and $U_M$) before and after applying a mapping. The input to the USM module can be a database containing user ratings for various items and a library of similarity measures (e.g., any of the user similarity measures described herein). The output from the USM module can be a mapping that attaches any one similarity measure to a user (e.g., each user). The property of the mapping can be such that each user is assigned to one and only one similarity function at a time. However, a similarity function can be assigned to none or more than one user. In case a user has defined his own version of a similarity measure, then for that user a mapping need not be computed because a similarity measure is already assigned.

Example 24

Exemplary Selection of Similarity Measure

In any of the examples herein, the user-to-similarity measure mapping can be computed in a variety of ways. For example, heuristic, exhaustive techniques, or the like can be used. An optimization and heuristics search technique (e.g., drawing on artificial intelligence or operations research) can be used in computing the user-to-similarity measure mapping.

Figure 15:
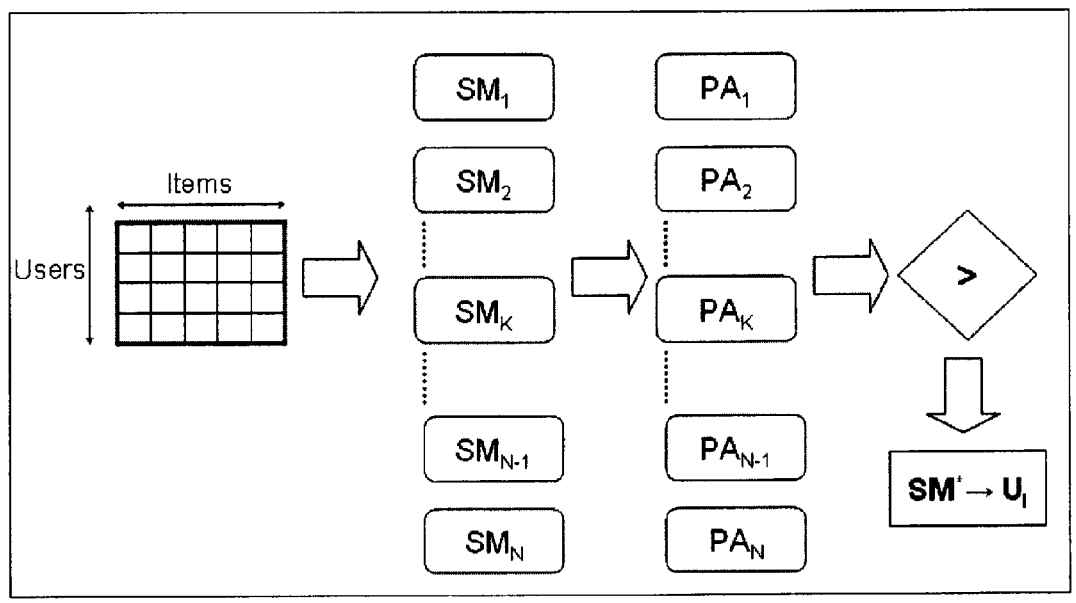
FIG. 15 is a process block diagram showing how mapping between users and similarity measures can be accomplished.

An automated way of computing the user-to-similarity measure mapping need not be restricted to a particular technique. For example, one way to find the similarity measure for a user is to try out the possible similarity measures for a user and select the one that performs best. FIG. 15 shows how the mapping between users and similarity measures can be accomplished. The user ratings database is divided into two sets: one set is called the "training" dataset whereas the other set is called the "test" data set. For a user (e.g., each user), the similarity measures (e.g., each similarity measure) is applied one by one to find neighboring users and determining the rating of products whose rating value is already known from the test dataset. The average predictive accuracy for the user for the similarity measure is determined. The similarity measure that gives the highest average predictive accuracy for a particular user is mapped to the user. The process is illustrated in the process block diagram 1500. Similarity measures $SM_{1-N}$ are applied for user $U_i$ to determine predictive accuracies $PA_{1-N}$. The best performing one (SM') is mapped to the user $U_i$.

Example 25

Exemplary USM

In any of the examples herein, a Users to Similarity Measure Mapping (USM) module can be employed. As shown in FIG. 14, the USM module can take as input the user ratings database and several similarity measures and can find the mapping between users and similarity measures. So, in the example of FIG. 14, the similarity measure best suited for user $U_1$ is $S_2$, whereas the similarity measure most appropriate for user $U_k$ is $S_1$. Two users can share the same similarity measure, and it is possible for a similarity measure to not be suitable for any user. In the example, a user (e.g., each user) is assigned to one and only one similarity measure at a time.

Figure 16:
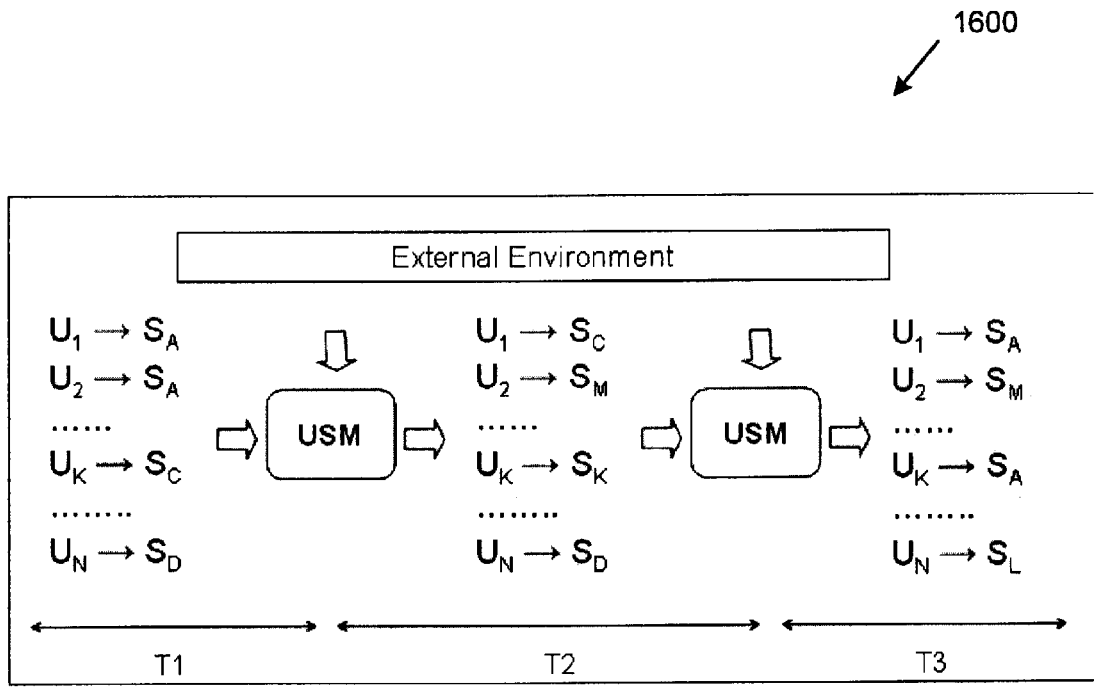
FIG. 16 is an illustration showing how the USM module can be invoked at various intervals of time.

A re-computation of the mapping between users and similarity measures can be done periodically. FIG. 16 illustrates an example 1600 of how the USM module can be invoked at various intervals of time. In the example, users $U_{1-N}$ are mapped to similarity measures $S_{A-M}$.

For example, the situation described in FIG. 12, where the average ratings of a user for various film genres changes over time is an illustration of a case when it could be beneficial to re-calculate the mapping. In is not always necessary that a user undergoes a change (e.g., in tastes or behavior) such that the similarity measure needs to change; the similarity measure can stay the same.

Example 26

Exemplary System

Figure 17:
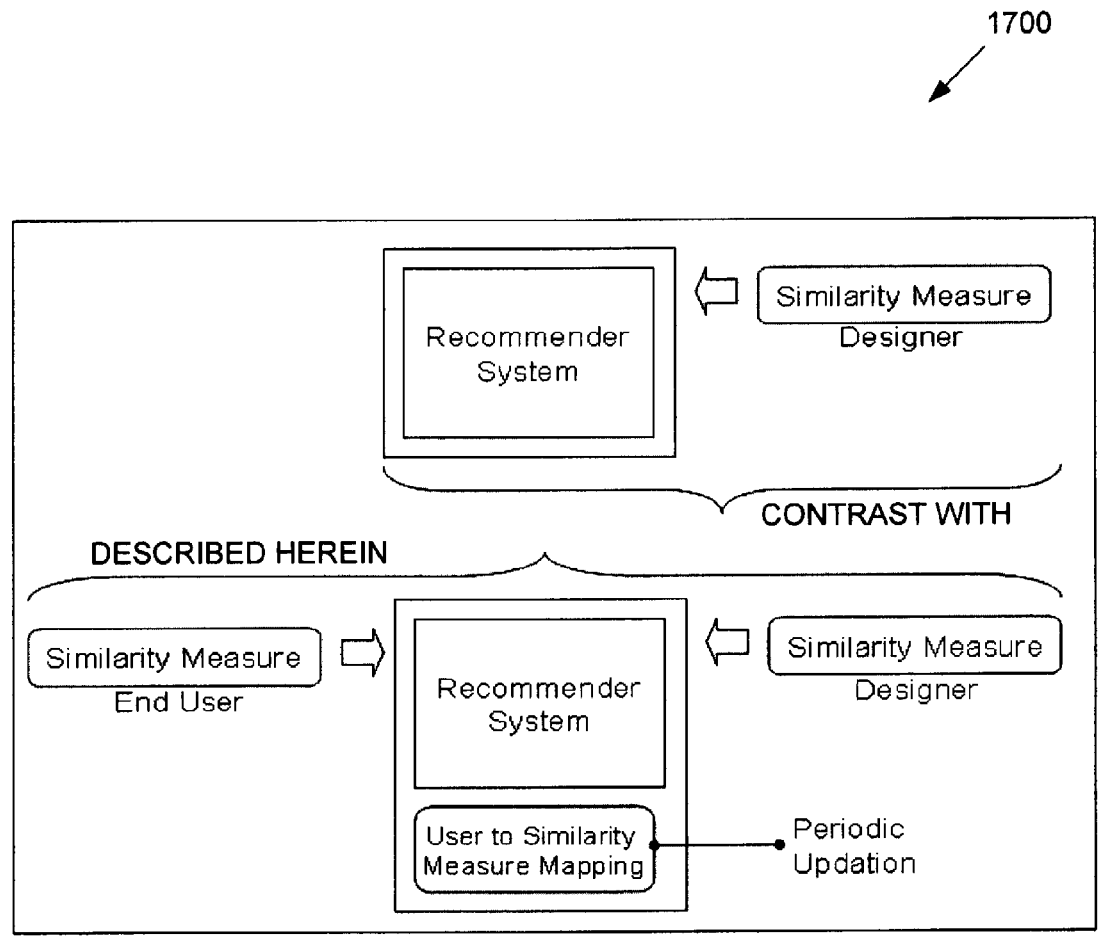
FIG. 17 is a high level diagram illustrating features of the technologies described herein.

FIG. 17 is a high level diagram 1700 illustrating features of the technologies described herein. Rather than limiting to a similarity measure chosen by the system designer for all users, the system can use a user-to-similarity measure mapping that is periodically updated. The similarity measure can also be selected or customized by the end user to whom recommendations are made.

Example 27

Exemplary Recommendations

In any of the examples herein, the determined recommendations can be provided to the user. The recommendations are calculated as those most likely to be in accordance with the user's tastes (e.g., based on the tastes of similar users).

Example 28

Exemplary Benefits

Any of the examples herein can be used to provide an automated, accurate, and efficient technique to help a customer select an item from a large number of available choices. The ever increasing amount of information and the sheer volume of choices available to a user have made the task of finding the right item very difficult.

Although keeping the similarity measures fixed can result in a simpler system, it can be beneficial to allow the flexibility of changing similarity measures to improve predictive accuracy which can result in better overall effectiveness of a recommender system.

There is thus a strong need for developing accurate and efficient techniques for making personalized recommendations from a large database of user interest profiles. The described technologies can be domain independent and applied to diverse domains.

Example 29

Exemplary Applications

Any of the examples herein can be applied in the area of E-commerce. Other areas where a recommendation engine is desired can also benefit. In addition, the technologies described herein can be used as a plug in for existing recommendation engines.

Example 30

Exemplary Computing Environment

Figure 18:
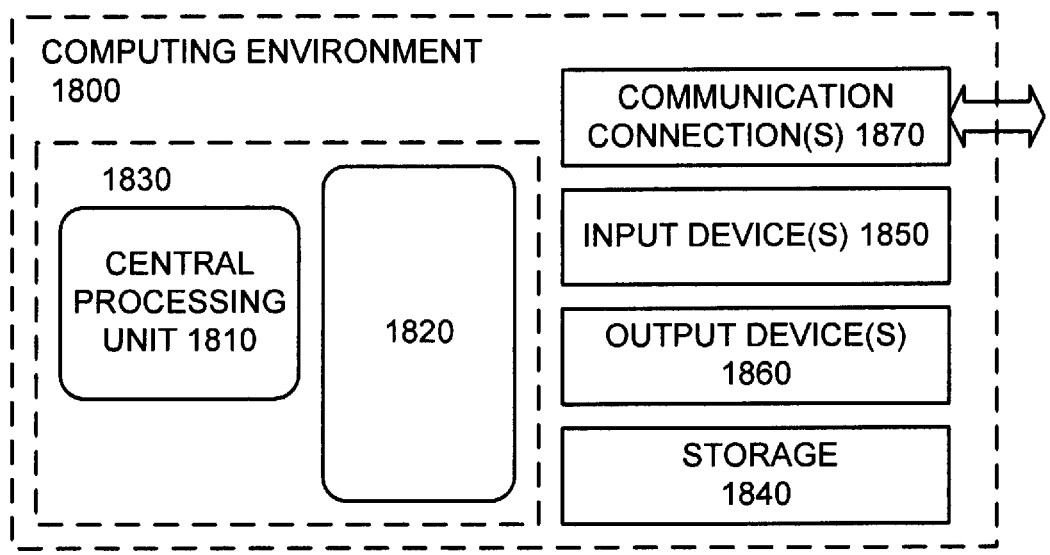
FIG. 18 is a block diagram of an exemplary suitable computing environment for implementing any of the technologies described herein.

FIG. 18 illustrates a generalized example of a suitable computing environment 1800 in which the described techniques can be implemented. For example, computing devices (e.g., physical machines) described herein can be configured as shown in the environment 1800. The computing environment 1800 is not intended to suggest any limitation as to scope of use or functionality, as the technologies can be implemented in diverse general-purpose or special-purpose computing environments. Mobile computing devices can similarly be considered a computing environment and can include computer-readable media. A mainframe environment can be different from that shown, but can also implement the technologies and can also have computer-readable media, one or more processors, and the like.

With reference to FIG. 18, the computing environment 1800 includes at least one processing unit 1810 and memory 1820. In FIG. 18, this basic configuration 1830 is included within a dashed line. The processing unit 1810 executes computer-executable instructions and can be a real or a virtual processor. In a multi-processing system, multiple processing units execute computer-executable instructions to increase processing power. The memory 1820 can be volatile memory (e.g., registers, cache, RAM), non-volatile memory (e.g., ROM, EEPROM, flash memory, etc.), or some combination of the two. The memory 1820 can store software implementing any of the technologies described herein.

A computing environment can have additional features. For example, the computing environment 1800 includes storage 1840, one or more input devices 1850, one or more output devices 1860, and one or more communication connections 1870. An interconnection mechanism (not shown) such as a bus, controller, or network interconnects the components of the computing environment 1800. Typically, operating system software (not shown) provides an operating environment for other software executing in the computing environment 1800, and coordinates activities of the components of the computing environment 1800.

The storage 1840 can be removable or non-removable, and includes magnetic disks, magnetic tapes or cassettes, CD-ROMs, DVDs, or any other computer-readable media which can be used to store information and which can be accessed within the computing environment 1800. The storage 1840 can store software containing instructions for any of the technologies described herein.

The input device(s) 1850 can be a touch input device such as a keyboard, keypad, touch screen, mouse, pen, or trackball, a voice input device, a scanning device, or another device that provides input to the computing environment 1800. For audio, the input device(s) 1850 can be a sound card or similar device that accepts audio input in analog or digital form, or a CD-ROM reader that provides audio samples to the computing environment. The output device(s) 1860 can be a display, printer, speaker, CD-writer, or another device that provides output from the computing environment 1800.

The communication connection(s) 1870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment.

Methods in Computer-Readable Media

Any of the methods described herein can be implemented by computer-executable instructions in one or more computer-readable media (e.g., computer-readable storage media, other tangible media, or the like). Such computer-executable instructions can cause a computer to perform the described method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. A computer-implemented method comprising:
choosing item recommendations for a plurality of users comprising at least a first user and a second user; and
outputting the item recommendations;
wherein choosing item recommendations for a plurality of users comprises:
for the first user, identifying, out of a plurality of possible user similarity measures, a first user similarity measure as most accurately identifying users who provided rating information similar to rating information provided by the first user;
for the first user, using the first user similarity measure to identify, from the plurality of users, a first set of similar users who provided rating information similar to the rating information provided by the first user;
for the first user, using the rating information provided by the first set of similar users to select a first item recommendation;
for the second user, identifying, out of the plurality of possible user similarity measures, a second user similarity measure as most accurately identifying users who provided rating information similar to rating information provided by the second user, wherein the second user similarity measure is different than the first user similarity measure;
for the second user, using the second user similarity measure to identify, from the plurality of users, a second set of similar users who provided rating information similar to the rating information provided by the second user; and for the second user, using the rating information provided by the second set of similar users to select a second item recommendation.

2. The method of claim 1 further comprising:
selecting a similarity measure for a particular user via a stored mapping between users and user similarity measures.

3. The method of claim 1 further comprising:
choosing item recommendations for a same user via different user similarity measures when applying collaborative filtering for the same user at different times while choosing item recommendations for an other user via a same user similarity measure.

4. The method of claim 1, wherein identifying a first user similarity measure comprises:
testing a plurality of similarity measures;
selecting a best performing similarity measure; and
storing an association associating the best performing similarity measure with the first user.

5. The method of claim 1 further comprising:
receiving from a user an indication regarding a preferred similarity measure; and
employing the preferred similarity measure when choosing recommendations for the user.

6. The method of claim 1 further comprising:
receiving from a user a user-defined similarity measure; and
employing the user-defined similarity measure when choosing item recommendations for the user.

7. The method of claim 6 wherein the user-defined similarity measure comprises a plurality of user-defined weight values provided.

8. The method of claim 1 wherein the choosing is performed in a single recommender system.

9. The method of claim 1 wherein the choosing is performed in a single recommendation engine.

10. One or more computer-readable non-transitory storage media having encoded thereon computer-executable instructions for performing a computer-implemented method comprising:
choosing item recommendations for different users via different user similarity metrics when applying collaborative filtering for the different users, wherein a user similarity metric is designated for one user independently of other users; and
outputting the item recommendations;
wherein choosing item recommendations for different users comprises (a)-(e):
(a) for a first user, identifying, out of a plurality of possible user similarity metrics, a first user similarity metric measuring similarity among users, wherein the identifying is based at least on performance of the first user similarity metric with respect to the first user;
(b) for the first user, using the first user similarity metric to identify a most similar user;
(c) choosing a first recommendation for the first user via collaborative filtering using the first user similarity metric measuring similarity among users, wherein a weight assigned to an influence of the most similar user is greater than a weight assigned to an influence of any other user when choosing a first recommendation for the first user via collaborative filtering;
(d) for a second user, identifying, out of the possible user similarity metrics, a second user similarity metric measuring similarity among users, wherein the identifying is based at least on performance of the second user similarity metric with respect to the second user, wherein the second user similarity metric is different from the first; and (e) choosing a second recommendation for the second user via the second user similarity metric measuring similarly among users;

wherein the first user similarity metric is implemented as a first similarity function that provides a value indicating distance between users; and the second user similarity metric is implemented as a second similarity function different from the first similarity function.

11. The computer-implemented method of claim 1 wherein:

the first user similarity measure and the second user similarity measure are chosen from the group consisting of:

Pearson Correlation Coefficient, Jacobian distance, Euclidean distance, Manhattan distance, and a custom similarity measure.

12. The computer-implemented method of claim 1, further comprising:

for the first user, using the first user similarity measure to identify, from the first set of similar users, a most similar user; and for the first user, weighting rating information provided by the most similar user more heavily than rating information provided by other users in the first set of similar users when selecting a first item recommendation.

13. The computer-implemented method of claim 1 wherein identifying a first user similarity measure comprises:

dividing the rating information provided by the first user into a training data set and a testing data set;

using the plurality of possible user similarity measures to identify respective test sets of similar users based on the training data set;

using the test sets of similar users to obtain, for the possible user similarity measures, respective sets of predicted rating information; and comparing the sets of predicted rating information to the rating information of the testing data set.

14. A computer-implemented method comprising:

choosing item recommendations for different users via different user similarity metrics when applying collaborative filtering for the different users, wherein a user similarity metric is designated for one user independently of other users; and outputting the item recommendations;

wherein choosing item recommendations for different users comprises (a)-(e):

(a) for a first user, identifying, out of a plurality of possible user similarity metrics, a first user similarity metric measuring similarity among users, wherein the identifying is based at least on performance of the first user similarity metric with respect to the first user;

(b) for the first user, using the first user similarity metric to identify a most similar user;

(c) choosing a first recommendation for the first user via collaborative filtering using the first user similarity metric measuring similarity among users, wherein a weight assigned to an influence of the most similar user is greater than a weight assigned to an influence of any other user when choosing a first recommendation for the first user via collaborative filtering;

(d) for a second user, identifying, out of the possible user similarity metrics, a second user similarity metric measuring similarity among users, wherein the identifying is based at least on performance of the second user similarity metric with respect to the second user, wherein the second user similarity metric is different from the first; and (e) choosing a second recommendation for the second user via the second user similarity metric measuring similarly among users;

wherein the first user similarity metric is implemented as a first similarity function that provides a value indicating distance between users; and the second user similarity metric is implemented as a second similarity function different from the first similarity function.

15. One or more computer-readable non-transitory storage media having encoded thereon computer-executable instructions for performing a computer-implemented method comprising:

choosing item recommendations for a plurality of users comprising at least a first user and a second user; and outputting the item recommendations;

wherein choosing item recommendations for a plurality of users comprises:

for the first user, identifying, out of a plurality of possible user similarity measures, a first user similarity measure as most accurately identifying users who provided rating information similar to rating information provided by the first user;

for the first user, using the first user similarity measure to identify, from the plurality of users, a first set of similar users who provided rating information similar to the rating information provided by the first user;

for the first user, using the rating information provided by the first set of similar users to select a first item recommendation;

for the second user, identifying, out of the plurality of possible user similarity measures, a second user similarity measure as most accurately identifying users who provided rating information similar to rating information provided by the second user, wherein the second user similarity measure is different than the first user similarity measure;

for the second user, using the second user similarity measure to identify, from the plurality of users, a second set of similar users who provided rating information similar to the rating information provided by the second user; and for the second user, using the rating information provided by the second set of similar users to select a second item recommendation.

* * * * *